United States Patent [19]

Hellmer et al.

[11] 4,302,434

[45] Nov. 24, 1981

[54] PROCESS FOR PRODUCING HYDROGEN AND SULPHUR FROM HYDROGEN SULPHIDE

[75] Inventors: Lars Hellmer, Cologne; Gerhard Keunecke, Geyen; Rainer Lell, Kerpen; Ghazi R. Al-Muddarris, Cologne; Reinhard Pachaly, Kerpen; Adolf Stauffer, Pulheim; V. Rao Vangala, Cologne, all of Fed. Rep. of Germany

[73] Assignee: Davy International Aktiengesellschaft, Frankfurt, Fed. Rep. of Germany

[21] Appl. No.: 139,593

[22] Filed: Apr. 11, 1980

[30] Foreign Application Priority Data

Apr. 14, 1979 [DE] Fed. Rep. of Germany ....... 2915210

[51] Int. Cl.$^3$ .................. C01B 17/04; C01B 3/04
[52] U.S. Cl. .................. 423/573 G; 423/571; 423/648 R
[58] Field of Search .................. 423/571, 573, 648

[56] References Cited

U.S. PATENT DOCUMENTS 4,039,613  8/1977  Kotera et al. .................. 423/573 X

FOREIGN PATENT DOCUMENTS 759375  5/1967  Canada .................. 423/648
2233278  1/1975  France .................. 423/573

OTHER PUBLICATIONS

Raymond, M. E. D.; "Hydrocarbon Processing" Jul. 1975, pp. 139-142.

*Primary Examiner*—G. O. Peters
*Attorney, Agent, or Firm*—Bernard, Rothwell & Brown

[57] ABSTRACT

A process is provided for the production of hydrogen and sulphur from a gas containing hydrogen sulphide. Such a process comprises passing the gas through a cracking zone at a temperature of from about 850° C. to 1600° C., cooling the cracked gas to a temperature of from about 110° C. to 150° C., and separating the condensed elemental sulphur. The uncracked hydrogen sulphide is separated and returned to the cracking zone; the remaining gas is withdrawn as hydrogen-rich gas.

14 Claims, 1 Drawing Figure

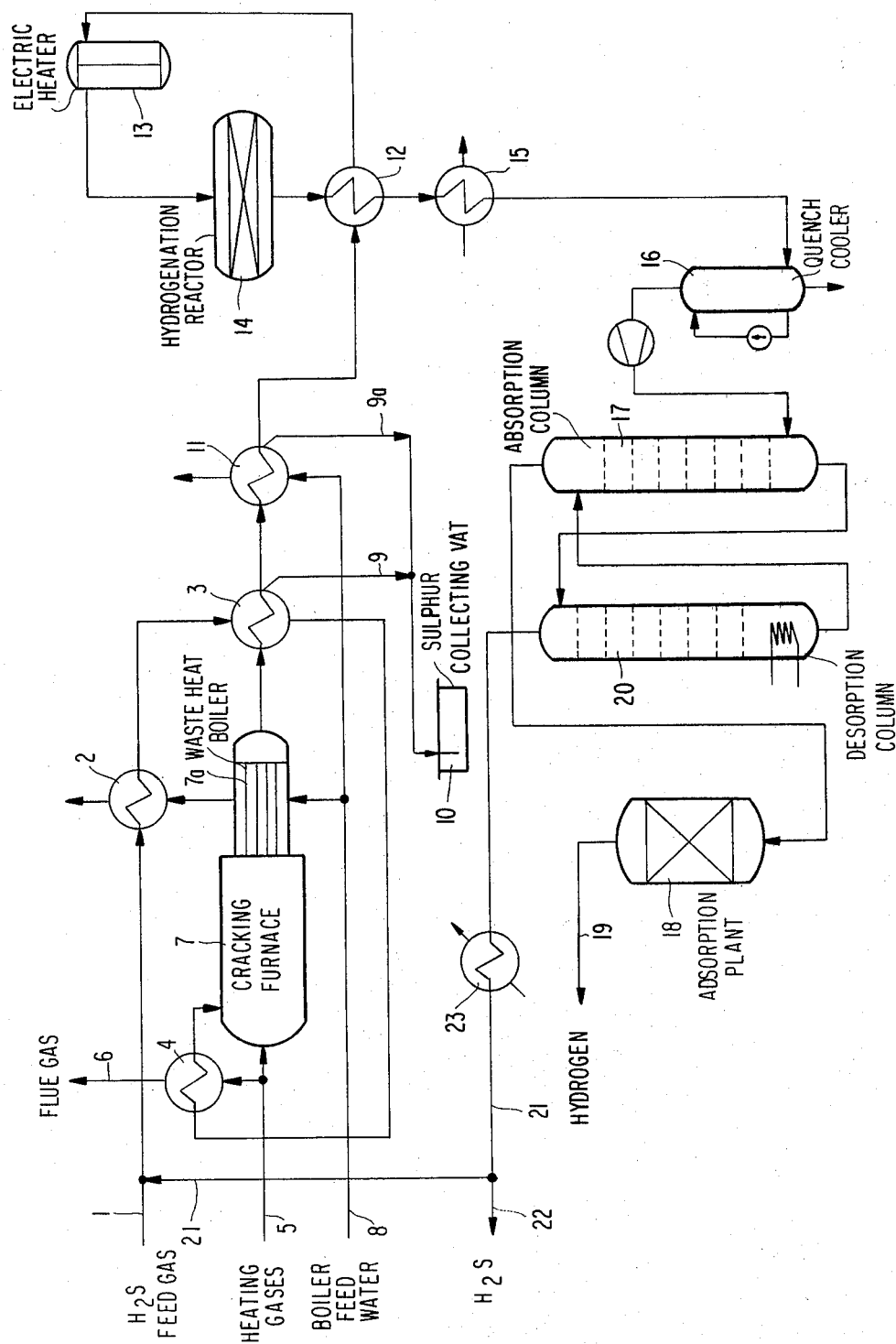

PROCESS FOR PRODUCING HYDROGEN AND SULPHUR FROM HYDROGEN SULPHIDE

The invention relates to a process for the production of hydrogen and sulphur from hydrogen sulphide by thermal cracking of hydrogen sulphide.

In numerous technical process, as for example in refineries in connection with the hydrogenating desulphurisation and the reforming of petroleum oil products, gases which contain hydrogen sulphide are formed, and these gases are usually processed into elementary sulphur using the Claus process. It is true that in this case there is recovery of the sulphur, a substantial part of the heat being liberated in the form of vapour; however, the hydrogen is converted into steam and, apart from direct utilisation of the heat, this steam is without value. Frequently, however, in the processes which precede the formation of hydrogen sulphide or in connection with the reaction forming hydrogen sulphide, a need for hydrogen exists, so that it would be advantageous to crack the hydrogen sulphide into its elementary constituents hydrogen and sulphur. Furthermore, the environmental pollution with hydrogen sulphide is reduced by such cracking.

Whereas the Claus reaction proceeds completely exothermally, it is necessary for energy to be supplied to the system when cracking the hydrogen sulphide in accordance with the reaction equation $$H_2S = 1/nS_n + H_2 - 83400 \, J.$$

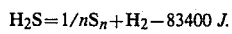

The cracking efficiency accordingly increases with rising temperature, but is still below 30% at about 1130° C. The cracking speed can be considerably improved by suitable catalysts; without a catalyst, the reaction proceeds above 975° C. at a sufficient speed [Hydrocarbon Processing (July 1975) pages 139–142].

The invention seeks to provide a process which is favourable as regards energy in order to produce hydrogen and sulphur from hydrogen sulphide, with which practically quantitative yields of sulphur and hydrogen are achieved in an economic manner. More especially, the outside energy to be supplied for the purpose is to be as low as possible.

According to the invention, the gas containing hydrogen sulphide is conducted through a cracking zone which is kept at a temperature in the range of from 850° to 1600° C., the cracked gas being cooled to temperatures in the range from 110° to 150° C., the elementary sulphur thereby condensed being separated from the cracked gas, the hydrogen sulphide which is not cracked being separated from the cracked gas, the separated hydrogen sulphide being returned into the cracking zone and the gas remaining at the time of separation being drawn off as hydrogen-rich gas. We have found that by this combination of processing steps, following a strictly thermal cracking of hydrogen sulphide, it is possible to achieve a practically complete cracking of the introduced hydrogen sulphide at temperatures which are acceptable as regards the heat consumption and the material stability. The preferred cracking temperatures are in the range of from approximately 900° to 1400° C., and the cracking efficiency is in the region of 10 to 40%. So as to avoid a reverse reaction and thus a deterioration in yield, the cracked gas is preferably cooled quickly, i.e. in less than about 0.15 sec., to below 800° C.

For this purpose, the cracking zone generally has a cooling zone directly connected to it in which a sufficient cooling of the gas is guaranteed within the time as indicated. Preferably, the cracking zone with the following cooling zone is developed in the form of a cracking furnace having a waste-heat boiler attached directly thereto on the outflow side. The boiler is charged with boiler feed water and is capable of generating steam in a pressure range from 3.5 to 35 bar. A cooling of the cracked gas to 350° C. is preferably already achieved in the waste-heat boiler. Thereafter, the cracked gas is cooled to 110° to 150° C., more especially to about 130° C., the main quantity of the sulphur which is formed being condensed. Mechanical sulphur separators such as those which are usual with Claus processes serve to separate the formed sulphur droplets from the cracked gas.

Since the preponderant part of the hydrogen sulphide passes unchanged through the cracking zone, this hydrogen sulphide has to be returned into the cracking zone. For this purpose, the cracked gas can be treated with a suitable washing liquid for hydrogen sulphide. Known absorption solutions can be used, for example, aqueous potash solution, aqueous ethanolamine solution or aqueous solutions of alkali salts of amino acids (alkazide washing). Since the cracked gases usually also contain carbon dioxide, which is formed by combustion of hydrocarbon in the cracking zone, attempts can be made to separate hydrogen sulphide and carbon dioxide in the course of this washing operation, so as to avoid the return of $CO_2$ into the cracking zone. For this purpose, it is possible initially for the hydrogen sulphide to be selectively washed out or scrubbed from the cracked gas with one of the said washing agents, this operation being followed by a second washing for the purpose of removing $CO_2$ from the gas. It is also possible for both gases to be jointly scrubbed and separately desorbed. The selective scrubbing of hydrogen sulphide from gases containing $H_2S$ and $CO_2$ is generally known. The washing or scrubbing solution is heated for the desorption of the hydrogen sulphide. The desorbed gas, rich in $H_2S$, also contains small amounts of steam and is heated on the return to the cracking zone with the feed gas containing hydrogen sulphide in a heat exchanger to at least 110° C., so as to avoid depositions of solid sulphur in the subsequent heat exchanger. As an alternative, it may be advantageous in many cases for the $H_2S$ and $CO_2$ present in the cracked gas to be condensed after the hydrogenation stage and then to be fractionated in liquid form. In this way, the hydrogen is concentrated and the quantity of $CO_2$ in the return gas is reduced.

In accordance with the preferred embodiment of the process according to the invention, the feed gas which contains hydrogen sulphide is directly and/or indirectly heated to the cracking temperature. The indirect heating may be effected by heat exchange with the hot cracked gas and/or with steam generated by heat exchange with the cracked gas in the waste heat boiler following the cracking zone, or possibly also by electrical heating. For the direct heating of the gas containing hydrogen sulphide, a heating medium is burnt in the cracking zone, such as for example natural gas or coke oven gas. Such heating gases may contain hydrogen sulphide or may consist to a considerable extent of hydrogen sulphide. In order to heat the feed gas containing hydrogen sulphide to the cracking temperature, provision is advantageously made for a gas containing hydrocarbon and/or hydrogen to be substoichiometrically burnt in the gas. The burning of the gas, as for example natural gas, coke oven gas, synthesis gas, or refinery gas, takes place directly in the cracking chamber, so that heat losses are restricted to a minimum value. With one embodiment of the process, it is possible for a part of the hydrogen produced in the process to be burnt. In order that the proportion of inert constituents in the cracked gas and thus in the produced hydrogen may be kept low, the substoichiometric combustion can be carried out with industrial oxygen or with oxygen-enriched air.

The cracked gas, after separating out the major part of the condensed elementary sulphur, is advantageously heated to temperatures in the range from 100° to 400° C., advantageously 300° to 350° C., and the gas is then conducted over a hydrogenation catalyst. The heating of the cracked gas to the hydrogenation temperature can be effected by heat exchange with the cracked gas flowing from the hydrogenation catalyst and/or by an electric heater. As hydrogenation catalyst, it is possible to use a cobalt/molybdenum sulphide catalyst, on which simultaneously carbon disulphide compounds are hydrolysed. On the catalyst, essentially uncondensed sulphur vapour contained in the cracked gas and also possibly carbon oxysulphide and, with the direct gas heating, any sulphur dioxide which may be formed, are hydrogenated with formation of hydrogen sulphide and carbon disulphide is hydrolysed with formation of hydrogen sulphide, in accordance with the following reaction equations:

$$COS + H_2 = H_2S + CO$$

$$S + H_2 = H_2S$$

$$SO_2 + 3H_2 = H_2S + 2H_2O$$

$$CS_2 + 2H_2O = 2H_2S + CO_2$$

Since the cracked gas generally only comprises small concentrations of residual sulphur vapour, carbon oxysulphide and sulphur dioxide, the consumption of hydrogen during the hydrogenation state is also small. By employing the hydrogenation, however, difficulties due to the said cracked gas constituents are avoided in the subsequent washing of hydrogen sulphide and/or purification of hydrogen.

As an alternative, the cracked gas can be subjected after the separation of the major part of the condensed sulphur, to a washing with water, the elementary sulphur which is washed out and dissolved gases can be separated from the washing water and the gases can be returned into the cracking zone. The removed elementary sulphur can be separated from the washing water, by filtration or possibly by centrifuging. The dissolved gases can be separated from the water by heating. The cracked gas is once again washed with the washing water which has thus been regenerated.

According to the preferred embodiment of the process according to the invention and for separating out the hydrogen sulphide, the cracked gas, after the separation of the sulphur and possibly after cooling to a temperature in the range from 20° to 80° C., preferably 30° to 50° C., is washed with a basic washing liquid and/or with a physically acting washing liquid. As a result of this washing operation, the undecomposed hydrogen sulphide and possibly carbon dioxide are separated from the residual cracked gas containing essentially hydrogen. If the cracked gas has previously passed through a hydrogenation stage, it is cooled from the hydrogenation temperature e.g. 300° to 350° C., to the washing temperature, e.g. 40° C. This cooling operation can be effected by indirect heat exchange with the cracked gas flowing to the hydrogenation stage and/or with the cold $H_2S$-containing feed gas flowing to the cracking zone and possibly a direct quench cooler. One or more columns advantageously serve for the absorption of the hydrogen sulphide and possibly of the carbon dioxide from the cracked gas. Aqueous potassium carbonate solutions, ethanolamine solutions or potassium salt solutions of amino acids (alkazide process) and known as $H_2S$ absorbents may be used as a basic washing liquid, while dimethyl ether of polyethylene glycol may, for example, serve as a physical washing liquid. The washing takes place under normal pressure or an elevated pressure (for example, at pressures up to 20 bar when washing with polyethylene glycol dimethyl ether). In the presence of substantial amounts of carbon dioxide in the cracked gas, the selective scrubbing of the hydrogen sulphide is advisable, so as to avoid the circulation of carbon dioxide through the cracking zone, which circulation is unfavourable from an energy point of view. Processes for the selective scrubbing of hydrogen sulphide and carbon dioxide from gases are generally known [cf., for example, Hydrocarbon Processing 53 (1974), No. 4, page 78]. The desorption of the hydrogen sulphide from the charged washing liquid is preferably effected by heating in another column. Depending on the washing liquid, the desorption temperatures are in the range of from 50° to 120° C.

With a feed gas which contains hydrogen sulphide and hydrocarbon, it is advantageous to provide for the gas to be conducted together with steam through the cracking zone. Such gases containing hydrocarbons are frequently formed as refinery acid gases, acid gases from the processing of natural gas or with the production of synthesis gas. The undesirable formation of soot in connection with the hydrocarbon cracking is avoided by the addition of steam. At the same time, additional hydrogen is thereby formed.

The effluent gas from the cracked gas washing stage for the separation of hydrogen sulphide can be further purified by adsorption, particularly when the use of the hydrogen necessitates a high degree of purity. Suitable adsorbents are, for example, activated carbon with an appropriate pore volume, molecular screens and silica gel, and others. The charging and regeneration of the adsorbent are preferably carried out by the pressure-change process. Impurities which are still present in the residual cracked gas are adsorbed and thus removed from the gas flow. The gas containing hydrogen sulphide is advantageously heated before entering the cracking zone by the hot cracked gas which discharges from the cracking zone. This can be achieved by gas/gas heat exchange or by heat transfer by means of steam or heat-carrier oil. The hot gases discharging from the hydrogenation stage may also be utilised for the partial preheating of the feed gas.

In accordance with one embodiment, provision is made for the uncracked hydrogen sulphide and possibly carbon dioxide to be separated by liquefaction from the cracked gas and for hydrogen sulphide and carbon dioxide to be separated by fractionation. With another embodiment of the process, the hydrogen sulphide can be separated from the feed gas by liquefaction, can be separated by fractionation from carbon dioxide which is possibly also separated out and the concentrated hydrogen sulphide thus recovered can be supplied to the cracking zone.

With one particular embodiment of the process according to the invention, a part of the hydrogen sulphide of the charging or initial gas is burnt in the cracking zone, in order to keep this zone at reaction temperature. In this case, the formation of carbon dioxide in the cracked gas is avoided, as is also the consumption of produced hydrogen for the heating of the cracking zone.

The invention is hereinafter more fully described by reference to the drawing, in which is represented the flow diagram of an installation by which one embodiment of the process according to the invention is carried into effect.

The gas containing hydrogen sulphide and supplied by way of a pipe 1 is first of all preheated with steam in the heat exchanger 2, is further heated in the heat exchanger 3 with hot cracked gas and is then heated in the exchanger 4 with flue gases produced by combustion of fuel or heating gas. The heating gases are supplied by a pipe 5, partly to the burner of the exchanger 4 and partly to the cracking furnace or oven 7. The flue gases leave the exchanger 4 through a pipe 6. By the combustion of a part of the heating gases in the cracking furnace 7, the gas containing $H_2S$ reaches a temperature of 1200° to 1300° C. in the furnace, some of the hydrogen sulphide being broken down into hydrogen and elementary sulphur.

The cracked gases thereafter flow through the waste-heat boiler 7a directly fitted to the furnace 7, and they are quickly cooled to about 600° C. in said boiler. The said boiler 7a has boiler feed water admitted to it through a pipe 8; as a result, steam of 30 bar is produced, which serves at least partially for preheating the feed gas in the exchanger 2 and is thereby condensed. The cracked gas is then further cooled to, for example, 130° C., in the heat exchanger 3 against the entry gas and in the condenser 11 against water supplied through pipe 8. As a result, elementary sulphur condenses, and this is discharged through pipes 9 and 9a and fed to the collecting vat 10.

In order to remove residual sulphur, small amounts of sulphur dioxide and possibly carbon disulphide compounds from the cracked gas, the latter is then supplied to a hydrogenation reactor 14. Since the hydrogenation takes place at about 300° to 350° C., the cooled cracked gas is initially heated in the gas/gas heat exchanger 12 against the hot hydrogenated gas and then in the electric heater 13 to the hydrogenation temperature. The hydrogenation reactor 14 contains a solid catalyst bed, in which the required reactions proceed. The gas leaving the reactor 14 contains all the sulphur in the form of hydrogen sulphide. It is then cooled in the heat exchangers 12 and 15 to, for example, 120° C. and thereafter in the quench cooler 16 to 40° C. It then passes into the absorption column 17, in which the hydrogen sulphide is scrubbed with an absorption liquid from the cracked gas. The gas leaving the column 17 at the top and consisting substantially of hydrogen is then purified from impurities in an adsorption plant 18. The product hydrogen leaves the installation through pipe 19. The washing can be so adjusted that the inert fractions in the cracked gas and resulting from the introduced gas are contained in the exhaust gas of the absorption column.

The absorption liquid charged with hydrogen sulphide is delivered to the heated desorption column 20, in which the hydrogen sulphide is driven off. The regenerated absorption liquid is pumped back to the absorption column 17. The hydrogen sulphide which is driven off is returned to the inlet pipe 1 through pipe 21, for the major part after cooling has taken place in the heat exchanger 23, and combined with the input or feed gas. A small part can be drawn off from the cycle through pipe 22.

As compared with the Claus process, with post-combustion of the tail gas, the process according to the invention is not only characterised by the additional availability of hydrogen, but also by a smaller emission of sulphur compounds into the atmosphere, since practically all sulphur compounds are conducted in circulation through the cracking zone and thus finally can be converted to elementary sulphur.

EXAMPLE 1

3200 $Nm^3/h$ of acid gas with a gauge pressure of about 0.5 bar, consisting of 90 mol-% $H_2S$ and 10 mol-% $CO_2$, are indirectly heated to about 900° C. together with 11744 $Nm^3/h$ of recycle gas from the desorber, consisting of 86.4 mol-% $H_2S$, about 9.5 mol-% $CO_2$, 3.8 mol-% $H_2O$ and about 0.2 mol-% $H_2$ and supplied to the cracking furnace. At the same time, 672 $Nm^3/h$ of methane are burnt with 1340 $Nm^3/h$ of pure oxygen in the burner of the cracking furnace. At the outlet of the latter, the gas consists of 55.3 mol-% $H_2S$, 11.5 mol-% $CO_2$, 9.7 mol-% $H_2O$, 15.7 mol-% $H_2$ and 7.8 mol-% sulphur. The process gas is quickly cooled to about 125° C. in the waste-heat boiler, gas/gas heat exchanger and sulphur condenser. As a result, 4100 kg/h of sulphur are separated out. The gas is then heated to about 300° to 320° C. and the sulphur which has remained in the gas and COS and $CS_2$ possibly formed by secondary reactions in the cracking furnace react on the hydrogenation catalyst to $H_2S$, so that the gas, after it has been cooled in the following heat exchanger, is free from sulphur dioxide and can be safely cooled to 40° C. by direct contact with water conducted in circulation. In the direct contact condenser, about 950 kg/h of water are removed from the process gas. In the absorber of the selective chemical scrubbing stage the major part of the $H_2S$ and a part of the $CO_2$ are separated from the remaining gas. 4065 $Nm^3/h$ of gas with about 1.2 mol-% $H_2S$, about 24.4 mol-% $CO_2$, 3.9 mol-% $H_2O$ and 70.1 mol-% $H_2$ leave the absorber. The charged liquor is regenerated in the desorber with 75 t/h of low-pressure steam. As a result, 11744 $Nm^3/h$ of gas are separated from the liquor, said gas consisting of 86.4 mol-% $H_2S$, about 9.5 mol-% $CO_2$, 3.8 mol-% $H_2O$ and 0.2 mol-% $H_2$. The gas is supplied by way of heat exchangers to the cracking furnace and again participates in the reaction in the cracking furnace, in the manner as initially described. In the foregoing example, $Nm^3$ represents cubic meters at 0° C. and one atmosphere.

What is claimed is:

1. A process for the production of hydrogen and sulphur by thermal cracking, said process comprising:
    (A) conducting a hydrogen sulphide-containing feed gas through a cracking zone maintained at a temperature of from about 850° C. to 1600° C., to thereby effect cracking of the hydrogen sulphide in said feed gas;
    (B) cooling the cracked gas to temperatures of from about 110° to 150° C. to thereby condense elemental sulphur formed by the cracking;

(C) separating said elemental sulfur condensed by said cooling from said cracked gas;

(D) heating the cracked gas, after said separation of the condensed sulfur, to temperatures in the range of from 100° to 400° C.;

(E) conducting the heated cracked gas over a hydrogenation catalyst;

(F) washing the cracked gas with a basic and/or with a physically acting washing liquid in order to separate uncracked and reconverted hydrogen sulfide therefrom;

(G) desorbing the separated hydrogen sulfide from said washing liquid and recycling the desorbed hydrogen sulfide to the cracking zone; and (H) drawing off the residual gas after separation of said elemental sulfur and said uncracked and reconverted hydrogen sulfide as hydrogen-rich gas.

2. A process according to claim 1, wherein the hydrogen sulphide-containing feed gas is directly and/or indirectly heated to the cracking temperature.

3. A process according to claim 2, wherein a gas containing hydrocarbon and/or hydrogen is sub-stoichiometrically burnt for heating the hydrogen sulphide-containing feed gas to the cracking temperature.

4. A process according to claim 3, wherein a part of the hydrogen produced in the process is burnt.

5. A process according to claim 1, wherein the cracked gas is heated to 300° to 350° C.

6. A process according to claim 1, 2, or 3, wherein the cracked gas, after the separation of the major part of the condensed sulphur, is subjected to a washing with water; the sulphur which is washed out and dissolved gases are separated from the washing water; and said gases are returned into the cracking zone.

7. A process according to claim 1, 2 or 3, wherein before washing, the cracked gas is cooled to a temperature in the range of from 20° to 80° C.

8. A process according to claim 7, wherein the cracked gas is cooled to a temperature in the range of from 30° to 50° C.

9. A process according to claim 1, 2 or 3, wherein the gas drawn off from the hydrogen sulphide washing is purified by adsorption.

10. A process according to claim 1, 2, or 3, wherein a feed gas containing hydrogen sulphide and hydrocarbons is conducted together with steam through the cracking zone.

11. A process according to claim 1, 2, or 3, wherein the feed gas containing hydrogen sulphide is heated by the heat of the cracked gas before entering the cracking zone.

12. A process according to claim 1, 2, or 3, wherein the uncracked hydrogen sulphide and any carbon dioxide present are separated by liquifaction from the cracked gas and the separated hydrogen sulphide and carbon dioxide are thereafter separated by fractionation.

13. A process according to claim 12, wherein the uncracked hydrogen sulphide thus recovered is recycled to the cracking zone.

14. A process according to claim 1, wherein some of the hydrogen sulphide of the feed gas is burnt in the cracking zone, so as to maintain the cracking zone at reaction temperature.

* * * * *